UNITED STATES PATENT OFFICE.

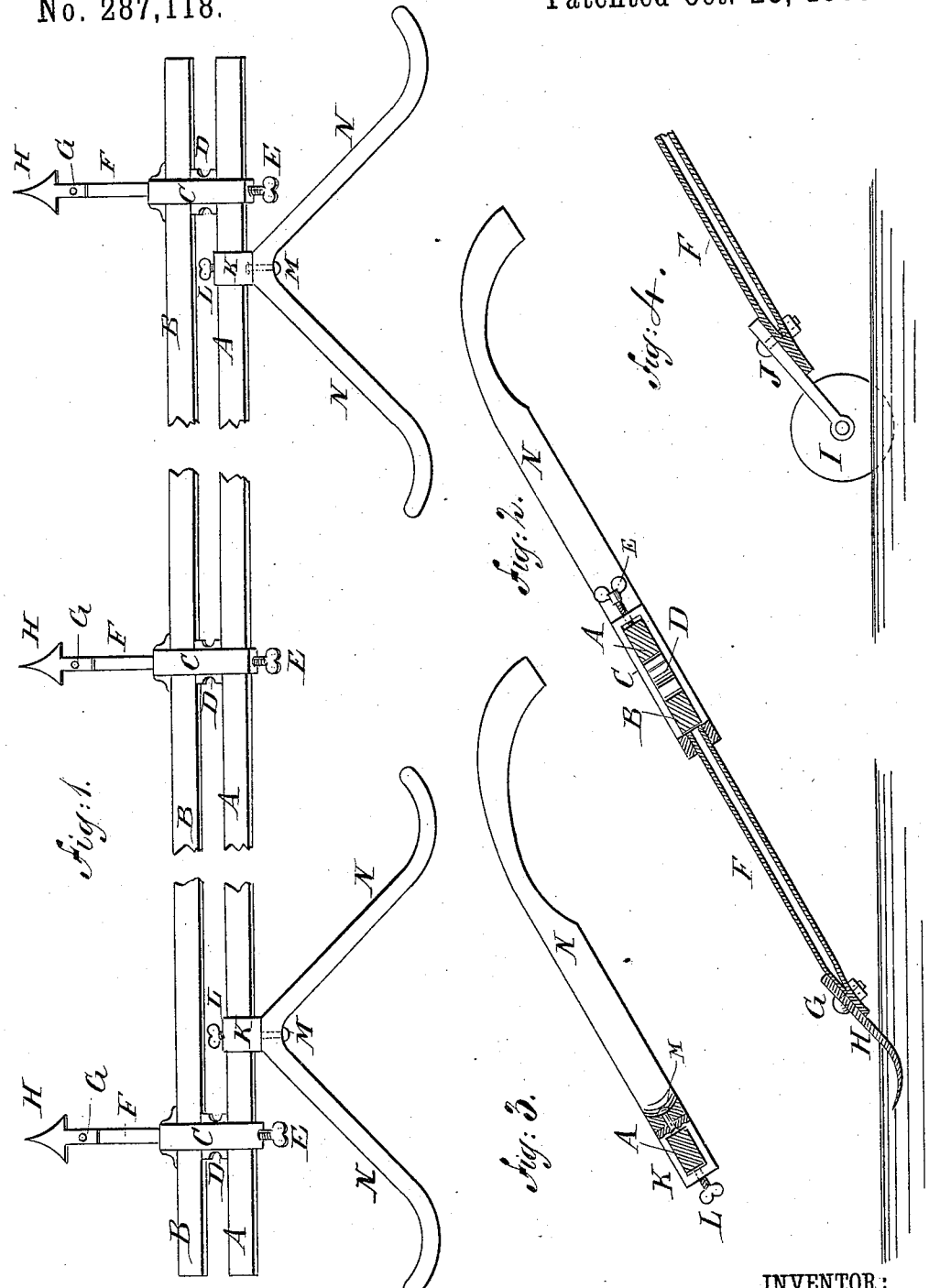

LOUIS GAIRAUD, OF SANTA CLARA, CALIFORNIA.

LAND-MARKER.

SPECIFICATION forming part of Letters Patent No. 287,118, dated October 23, 1883.

Application filed February 17, 1883. (No model.)

*To all whom it may concern:*

Be it known that I, LOUIS GAIRAUD, of Santa Clara, in the county of Santa Clara and State of California, have invented a new and useful Improvement in Land-Markers, of which the following is a full, clear, and exact description.

Reference is to be had to the accompanying drawings, forming a part of this specification, in which similar letters of reference indicate corresponding parts in all the figures.

Figure 1 is a front elevation of my improvement, parts being broken away. Fig. 2 is a sectional end elevation of the same taken through one of the plows. Fig. 3 is a sectional end elevation of the same taken through one of the handles. Fig. 4 is a sectional side elevation of one of the plow-standards, and showing a tracing-wheel in side view.

The object of this invention is to facilitate the accurate marking of land for the planting of grape-vines, trees, and other plants.

The invention consists in a land-marker constructed with two parallel bars provided with adjustable slides carrying plow-standards and plows, and with adjustable slides carrying handles. The adjustable slides are secured in place by set screws, and the parallel bars are held apart and supported against the pressure of the said set-screws by blocks interposed between the said bars, and placed within the said slides, as will be hereinafter fully described.

A B are two parallel bars of any desired breadth and thickness, and forty feet (more or less) in length.

C are slotted bars or bands, the slots or openings of which are made of such a size as to receive the bars A B, and the blocks D placed in the slides C and between the bars A B, to keep the said bars at a proper distance apart.

Through the upper ends of the slides C pass set-screws E, to rest against the edges of the bar A, and fasten the said slides in place upon the bars A B and blocks D.

To the lower ends of the slides C are attached the upper ends of the standards F, which I prefer to make tubular, to give them the necessary lightness and strength.

To the lower ends of the standards F are secured by bolts G the shanks of the plows H, which may be curved, as shown in Fig. 2, or made of any other shape; or the plows H may be replaced by wheels I, the shanks J of which are bolted to the said standards F, and which are so shaped as to properly mark the ground.

Upon the bar A are placed bands or slides K, which are kept in place by set-screws L passing through them and resting against the said bar. To the slides K are secured, by screws or rivets M, or other suitable means, the handles N, by means of which the machine is drawn and guided.

In marking land for orchards, three plows are used, which are placed twenty feet apart.

In marking land for vines and other plants, four, five, six, or any other desired number of plows can be used, as the desired distance apart of the plants may require.

In using the marker a straight furrow is drawn along one side of the field, and the marker is drawn along the said furrow, and is drawn back and forth until the whole field is marked, one plow of the marker being always kept in the last mark previously made. The field is then marked in the same manner at right angles to the first set of marks, and the plants are set at the points where the marks cross each other.

Having thus described my invention, I claim as new and desire to secure by Letters Patent—

1. A land-marker constructed substantially as herein shown and described, and consisting of two parallel bars provided with adjustable slides carrying the plow-standards, and with adjustable slides carrying the handles, as set forth.

2. In a land-marker, the combination, with the bars A B and the plow-standards and plows F H, of the slides C and set-screws E, substantially as herein shown and described, whereby the said plow-standards and plows can be readily adjusted at any desired distance apart and will be securely held in place, as set forth.

3. In a land-marker, the combination, with the parallel bars A B and the slides C, of the blocks D, substantially as herein shown and described, whereby the said bars will be kept at the desired distance apart and will be supported against the pressure of the set-screws, as set forth.

4. In a land-marker, the combination, with the bar A, of the slides K, the set-screws L, and the handles N, substantially as herein shown and described, whereby the said handles will be held securely in place and can be readily adjusted, as set forth.

LOUIS GAIRAUD.

Witnesses:
 GEO. M. YOELL,
 SAM P. HOWES.